United States Patent
Lee et al.

(10) Patent No.: US 8,130,835 B2
(45) Date of Patent: Mar. 6, 2012

(54) METHOD AND APPARATUS FOR GENERATING MOTION VECTOR IN HIERARCHICAL MOTION ESTIMATION

(75) Inventors: Jae-hun Lee, Yongin-si (KR); Nam-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1773 days.

(21) Appl. No.: 11/091,954

(22) Filed: Mar. 29, 2005

(65) Prior Publication Data
US 2005/0249284 A1 Nov. 10, 2005

(30) Foreign Application Priority Data
Mar. 29, 2004 (KR) ........................ 10-2004-0021147

(51) Int. Cl.
*H04N 7/12* (2006.01)
*H04N 11/02* (2006.01)
(52) U.S. Cl. .............................. 375/240.16; 375/240.24
(58) Field of Classification Search ............. 375/240.16, 375/240.24
See application file for complete search history.

(56) References Cited

U.S. PATENT DOCUMENTS

| | | | |
|---|---|---|---|
| 5,473,379 A * | 12/1995 | Horne ....................... | 375/240.16 |
| 5,477,272 A | 12/1995 | Zhang et al. | |
| 5,484,779 A * | 1/1996 | Sauter et al. .................... | 514/63 |
| 5,485,279 A * | 1/1996 | Yonemitsu et al. ....... | 375/240.14 |
| 5,510,787 A * | 4/1996 | Koster ........................... | 341/76 |
| 6,084,908 A | 7/2000 | Chiang et al. | |
| 6,269,174 B1 | 7/2001 | Koba et al. | |
| 6,438,170 B1 * | 8/2002 | Hackett et al. ........... | 375/240.16 |
| 6,442,203 B1 * | 8/2002 | Demos ..................... | 375/240.16 |
| 6,483,928 B1 | 11/2002 | Bagni et al. | |
| 6,867,714 B2 * | 3/2005 | Song et al. ............... | 375/240.16 |

(Continued)

FOREIGN PATENT DOCUMENTS
CN 1272031 A 11/2000
(Continued)

OTHER PUBLICATIONS

Notice of Patent Decision dated Oct. 28, 2010, issued in counterpart Korean Patent Application No. 10-2004-0021147.

*Primary Examiner* — David Czekaj
*Assistant Examiner* — Anner Holder
(74) *Attorney, Agent, or Firm* — Sughrue Mion, PLLC

(57) ABSTRACT

A method and apparatus is provided for generating a middle level motion vector in hierarchical motion estimation. TA second-resolution-frame motion vector is generated in a second resolution frame having a second resolution from a first-resolution-frame motion vector in a first resolution frame having a first resolution, the second resolution being higher than the first resolution. A local-search reference point is determined in the second-resolution frame based on the first-resolution-frame motion vector, and the second-resolution-frame motion vector is generated by performing a local search process on the second resolution frame based on the determined local-search reference point. The local search process is performed based on matching reference values for lower estimation blocks, each of the lower estimation blocks comprise pixel values of some portions of a current estimation block and a past estimation block. The current estimation block is an estimation block of a current frame and the past estimation block is an estimation block of a corresponding past frame. Accordingly, an amount of operations for the matching reference values can be reduced.

17 Claims, 9 Drawing Sheets

U.S. PATENT DOCUMENTS

| | | | |
|---|---|---|---|
| 7,239,721 B1 * | 7/2007 | Kumar et al. | 382/107 |
| 7,362,808 B2 * | 4/2008 | Kang | 375/240.16 |
| 2002/0114392 A1 | 8/2002 | Sekiguchi et al. | |
| 2003/0043912 A1 | 3/2003 | Sun et al. | |

FOREIGN PATENT DOCUMENTS

| | | |
|---|---|---|
| JP | 10-243404 A | 9/1998 |
| JP | 2000-350209 A | 12/2000 |
| JP | 2002-330443 A | 11/2002 |
| KR | 1999-012725 A | 2/1999 |
| KR | 100251548 B1 | 1/2000 |
| KR | 2001-0045132 A | 6/2001 |
| KR | 2001-0073608 A | 8/2001 |
| KR | 2002-0077884 A | 10/2002 |
| WO | WO 98/03018 A2 | 1/1998 |

* cited by examiner

METHOD AND APPARATUS FOR GENERATING MOTION VECTOR IN HIERARCHICAL MOTION ESTIMATION

BACKGROUND OF THE INVENTION

This application claims priority from Korean Patent Application No. 2004-21147, filed on Mar. 29, 2004 in the Korean Intellectual Property Office, the disclosure of which is incorporated herein in its entirety by reference.

1. Field of the Invention

The present invention relates to hierarchical motion estimation of video data, and more particularly, to a middle level motion vector generation method and apparatus capable of reducing an amount of operations applied to a macroblock adaptive frame-field (MBAFF) mode.

2. Description of the Related Art

In motion estimation, which is a process for encoding video data, a macroblock in a past frame most similar to a macroblock in a current frame is searched by using a predetermined measurement function, so that a motion vector representing difference between positions of the macroblocks is generated. The criterion used to determine the most-similar macroblock is a matching reference value, which is a value of a predetermined measurement function. In general, the largest amount of operations is needed for the determination of the most-similar macroblock in the process for encoding video data.

The search process is a process for searching a block in the past frame most similar to the block of the current frame to be encoded in accordance with a predetermined search range and a predetermined block size. The search process is classified into a full search process and a local search process. The full search process is performed on all the portions of frames, and the local search process is performed on some portions of the previous frames based on a predetermined reference point.

Similarity between blocks of the past and current frames is determined by using all the pixel values in the past and current frames. A matching reference value is calculated by using the predetermined measurement function. The measurement function includes a Sum of Absolute Difference (SAD) function for obtaining a sum of absolute difference, a Sum of Absolute Transformed Difference (SATD) function for obtaining a sum of absolute transformed difference, and a Sum of Squared Difference (SSD) function for obtaining a sum of squared difference.

A large amount of operations for the calculation of the matching reference value is needed. Accordingly, much hardware resource is needed to implement real-time video data encoding. The hierarchical motion estimation technique has been developed in order to reduce the amount of operations in the motion estimation. In the hierarchical motion estimation technique, an original frame is divided into frames having different resolutions and motion vectors corresponding to the frames having the different resolutions are hierarchically generated. The most widely known method used for the hierarchical motion estimation technique is a multi-resolution multiple candidate searching (MRMCS) method.

FIG. 1 is a conceptual view of conventional hierarchical motion estimation. A middle level motion estimation process is performed in multiple levels: a lower level 104 where blocks of the to-be-encoded current and past frames have the same resolution as that of an original image; a middle level 102 where the resolution is reduced by decimating the original image in the lower level 104 with a decimation ratio of 2:1 (horizontal:vertical); and an upper level 100 where the resolution is further reduced by decimating the image decimated in the middle level with a decimation ratio of 2:1. In the hierarchical motion estimation, the motion estimation is performed in the levels by using three images having different resolutions, so that the motion estimation can be preformed at a high speed.

Now, the conventional hierarchical motion estimation will be described in detail. In the motion estimation, it is assumed that the motion estimation is performed in units of a macroblock having a size of 16×16 and a search range in the motion estimation is [−16, +16]. The hierarchical motion estimation comprises three steps as follows.

In the first step, a search process is performed in the upper level to search a block of the past frame having a size of 4×4 (¼ of an original size) matching with a current block having a size of 4×4 (¼ of the original size). The search range in the upper level is [−4, 4] (¼ of the original search range). In general, an SAD function is used as a measurement function for the matching reference values. Based on the results of the search process in the upper level, two blocks firstly and secondly matching with the current block are determined, and motion vectors for the two blocks are obtained.

In the second step, a median motion vector is calculated from three motion vectors of three neighboring macroblocks located at left, right, and upper right sides of the current macroblock at lower level. The motion vectors of the three neighboring macroblocks are determined in advance. The median motion vector is the median value of the three motion vectors.

Next, one block most matching with the current block and the corresponding motion vector are obtained by performing a local search process over a search range of [−2, +2] on a past frame having ½ of the original size based on three points including the two upper left corner points of the two blocks determined in the middle level 102 and one point indicated by the median motion vector.

In the third step, one macro block most matching with the current macroblock and the corresponding motion vector are finally obtained by performing a local search process over a search range of [−2, 2] on the past frame in the lower level 104, that is, the past frame having an original size based on an upper left corner point of one block determined in the middle level 102.

On the other hand, in the current motion picture standards including the H.264 and MPEG2 standards, field motion estimation as well as frame motion estimation is employed in order to support an interlacing scan scheme. In particular, the H.264 and MPEG2 standards support the NBAFF mode where the frame and field motion estimation processes are performed in units of not a picture but a macroblock.

However, if the aforementioned hierarchical motion estimation scheme is simply applied to the motion picture standards supporting the MBAFF mode, the amount of operations drastically increases because the middle level motion vector is obtained by separately calculating matching reference values for the frame and field motion estimation processes.

SUMMARY OF THE INVENTION

The present invention provides a middle level motion vector generation method and apparatus capable of reducing an amount of operation for generating a middle level motion vector in a case where a hierarchical motion estimation process is applied to motion picture standards supporting a macroblock adaptive frame-field (MBAFF) mode.

According to an aspect of the present invention, there is provided a motion vector generation method of generating a second-resolution-frame motion vector in a second resolution frame having a second resolution from a first-resolution-frame motion vector in a first resolution frame having a first resolution, the second resolution being higher than the first resolution, the method comprising: (a) determining a local-search reference point in the second-resolution frame based on the first-resolution-frame motion vector; and (b) generating the second-resolution-frame motion vector by performing a local search process on the second resolution frame based on the determined local-search reference point, wherein the local search process is performed based on matching reference values for lower estimation blocks, wherein each of the lower estimation blocks comprise pixel values of some portions of a current estimation block and a past estimation block, and wherein the current estimation block is an estimation block of a current frame and the past estimation block is an estimation block of a corresponding past frame.

The step (b) may comprise: (b1) calculating lower matching reference values for the lower estimation blocks; (b2) calculating upper matching reference values corresponding to motion vectors defined in a macroblock adaptive frame-field (MBAFF) mode based on the lower matching reference values; and (b3) determining a past-frame block point representing a position of a past frame having a minimum value out of the upper matching reference values, and calculating the second-resolution-frame motion vector based on the determined past-frame block point.

In a case where the present invention is applied to the MPEG2 standard, each of the past and current estimation blocks may be a macroblock. In a case where the present invention is applied to the H.264 standard, each of the past and current estimation blocks may be a macroblock pair.

According to another aspect of the present invention, there is provided a motion vector generation method comprising: converting an original-resolution frame into one or more hierarchical-resolution frames in a current estimation block to be currently encoded; and generating motion vectors of the hierarchical-resolution frames, wherein the generation of the motion vectors are performed based on matching reference values for lower estimation blocks, wherein each of the lower estimation blocks comprises pixels values of some portions of the current estimation block and a past estimation block, and wherein the past estimation block is an estimation block of a corresponding past frame.

In the above mentioned exemplary aspect, the method may further comprise: (a) generating a first resolution frame having a first resolution, a second resolution frame having a second resolution which is higher than the first resolution, and an original resolution frame having an original resolution which is higher than the second resolution by decimating the frame to be encoded; (b) generating an upper level motion vector in the first resolution frame by performing a full search process on the current estimation block; (c) generating a middle level motion vector in the second resolution frame by generating matching reference values for the lower estimation block and performing a local-search process using the upper level motion vector as a reference point based on the matching reference values; and (d) generating a lower level motion vector in the original resolution frame by performing a local-search process using the middle level motion vector as a reference point based on the matching reference values.

According to still another exemplary aspect of the present invention, there is provided a motion vector generation apparatus for generating a second-resolution-frame motion vector in a second resolution frame having a second resolution from a first-resolution-frame motion vector in a first resolution frame having a first resolution, the second resolution being higher than the first resolution, the apparatus comprising: a reference point determination unit, which determines a local-search reference point in the second-resolution frame based on the first-resolution-frame motion vector; and a motion vector generation unit, which generates the second-resolution-frame motion vector by performing a local search process on the second resolution frame based on the determined local-search reference point, wherein the local search process is performed based on matching reference values for lower estimation blocks, wherein each of the lower estimation blocks comprise pixel values of some portions of a current estimation block and a past estimation block, and wherein the current estimation block is an estimation block of a current frame and the past estimation block is an estimation block of a corresponding past frame.

According to further still another exemplary aspect of the present invention, there is provided a motion vector generation apparatus where an original-resolution frame is converted into one or more hierarchical-resolution frames in a current estimation block to be currently encoded, and motion vectors of the hierarchical-resolution frames are generated, wherein the generation of the motion vectors are performed based on matching reference values for lower estimation blocks, wherein each of the lower estimation blocks comprise pixel values of some portions of the current estimation block and a past estimation block, and wherein the past estimation block is an estimation block of a corresponding past frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
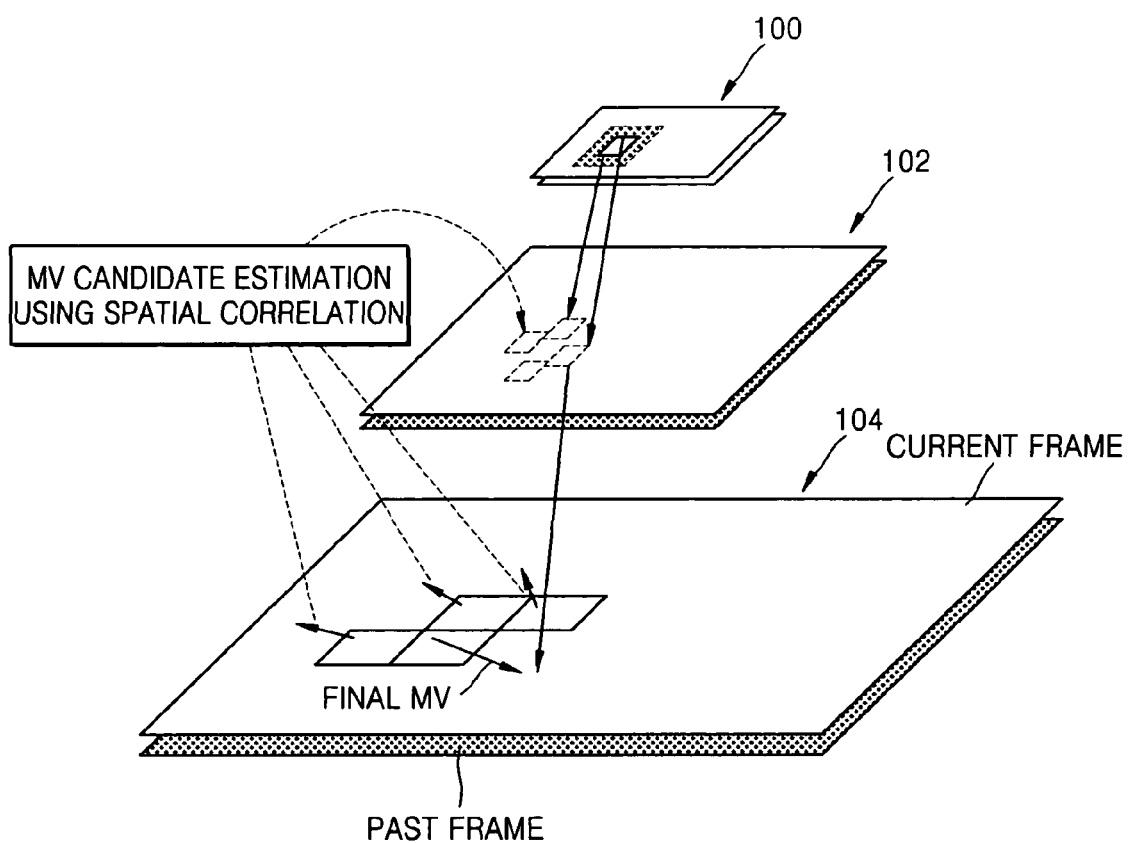
FIG. 1 is a conceptual view of conventional hierarchical motion estimation.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Now, definitions of terms used in the specification are as follows.

A level means a logical space in hierarchical motion estimation where a motion estimation process is performed on one of frames having various resolutions obtained from an original-resolution frame.

A lower level means a level where a motion vector generation process is performed on the original-resolution frame.

A middle level means a level where a motion vector generation process is performed on a low-resolution frame obtained by decimating the original-resolution frame.

A higher level means a level where a motion vector generation process is performed on a lowest-resolution frame obtained by decimating the low-resolution frame in the median level.

An estimation block means a unit block used for a motion estimation process in a motion picture encoding method. For example, an estimation block in accordance with the MPEG2 motion picture standard is a macroblock having 16×16 pixels. In addition, an estimation block in accordance with the H.624 motion picture standard is a macroblock pair having a size of 16×32 pixels.

The estimation ion blocks are classified into a current estimation block and a past estimation block. The current estimation block is an estimation block in a current frame. The past estimation block is an estimation block in a past frame corresponding to the current estimation block. The current and past estimation blocks are defined in each of the levels. Each of the current and past estimation blocks in the median and upper levels has a size reduced by a predetermined decimation ratio in comparison with the corresponding one in the lower level.

A block point means a point, which specifies a location of a current estimation block or a corresponding past estimation block.

In an exemplary embodiment of the present invention, a measurement function used to calculate a matching reference value includes SAD, SATD, and SSD functions. Hereinafter, the present invention will be described by using the SAD function for convenience.

Figure 2:
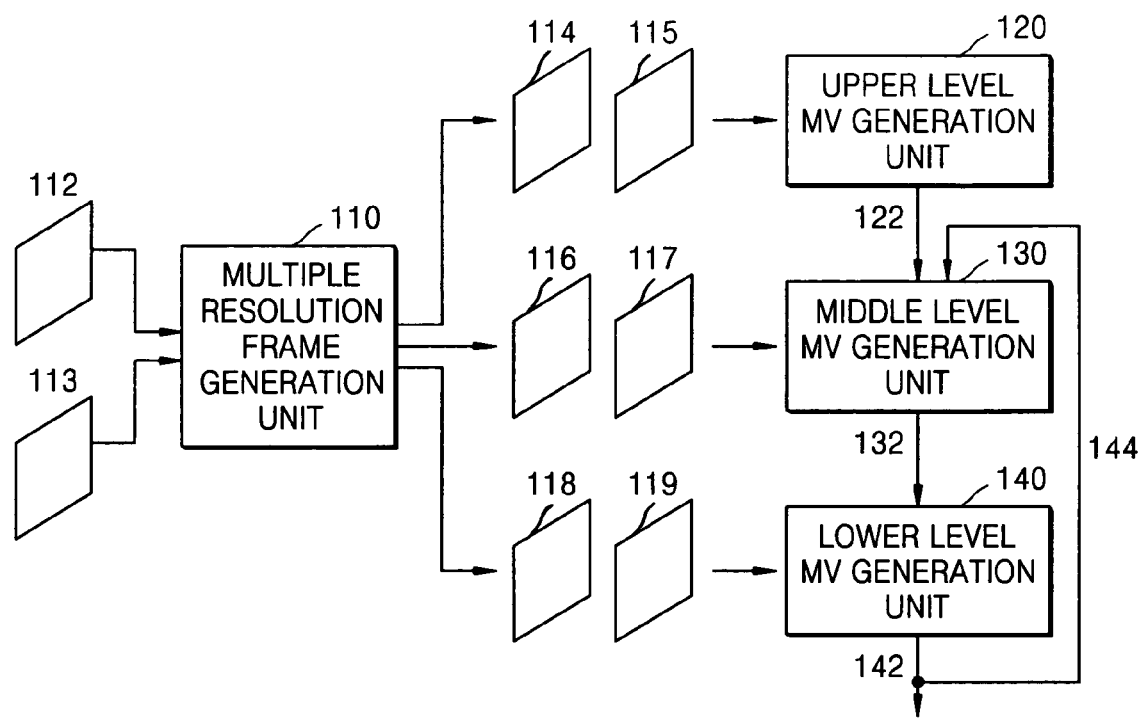
FIG. 2 is a diagram showing a motion vector generation apparatus according to an exemplary embodiment of the present invention.

FIG. 2 is a diagram showing a motion vector generation apparatus according to an exemplary embodiment of the present invention.

The motion vector generation apparatus comprises a multiple resolution frame generation unit 110, an upper level motion vector generation unit 120, a middle level motion vector generation unit 130, and a lower level motion vector generation unit 140.

The multiple resolution frame generation unit 110 generates a plurality of past and current frames 114 to 119 having different resolutions by decimating past and current frame 112 and 113 of an original image based on their own resolutions.

The past and current upper level frame 114 and 115 are frames in upper level obtained by decimating the past and current frame 112 and 113 of the original image at a decimation ratio of 4:1. The past and current middle level frame 116 and 117 are frames in middle level obtained by decimating the past and current frame 112 and 113 of the original image at a decimation ratio of 2:1. The past and current lower level frame 118 and 119 are frames in lower level obtained from the past and current frame 112 and 113 of the original image without the decimation.

The upper level motion vector generation unit 120 generates an upper level motion vector 122 by performing a full-search process on a predetermined search range of the past and current upper level frame 114 and 115. In the case of the H.264 standard, since an estimation block in the lower level has a size of 16×32, an estimation block in the upper level has a size of 4×8. In the case of the MPEG2 standard, since an estimation block in the lower level has a size of 16×16, an estimation block in the upper level has a size of 4×4.

More specifically, the upper level motion vector is generated by performing the SAD operation on blocks having a size of 4×8 (in the case of the H.264 standard) or 4×4 (in the case of the MPEG2 standard) in the past and current upper level frames, determining a block point in the past frame having the lowest SAD value, and calculating the upper level motion vector based on the block point.

The middle level motion vector generation unit 130 generates a middle level motion vector 132 by determining a median-level search reference point based on the upper level motion vector and performing a local-search process on a predetermined search range of the past middle level frame 116 based on the determined middle-level search reference point.

In an alternative exemplary embodiment, an additional search reference point may be provided which is determined based on the lower level motion vector 114 generated from a previously determined current estimation block. The additional search reference point is determined by using a block point indicated by a lower level motion vector near the current estimation block in the lower level.

There are six middle level motion vectors to be generated in the case of the H.264 standard to which the MBAFF mode is applied. The six middle level motion vectors are: a top-top frame motion vector used for an upper half of a current estimation block and an upper half of a corresponding past estimation block; a bottom-bottom frame motion vector used for a lower half of a current estimation block and a lower half of a corresponding past estimation block; a top-top field motion vector used for an odd field of a current estimation block and an odd field of a corresponding past estimation block; a bottom-bottom field motion vector used for an even field of a current estimation block and an even field of a corresponding past estimation block; a top-bottom field motion vector used for an odd field of a current estimation block and an even field of a corresponding past estimation block; and a bottom-top field motion vector used for an even field of a current estimation block and an odd field of a corresponding past estimation block.

Here, each of the past and current estimation blocks is a macroblock pair having a size of 8×16 pixels in the median level.

On the other hand, there are five motion vectors to be generated in the case of the MPEG2 standard to which the MBAFF mode is applied. The five motion vectors are: a frame motion vector used for a current estimation block and a corresponding past estimation block; a top-top field motion vector used for an odd field of a current estimation block and an odd field of a corresponding past estimation block; a bottom-bottom field motion vector used for an even field of a current estimation block and an even field of a corresponding past estimation block; a top-bottom field motion vector used for an odd field of a current estimation block and an even field of a corresponding past estimation block; and a bottom-top field motion vector used for an even field of a current estimation block and an odd field of a corresponding past estimation block.

Here, each of the past and current estimation blocks is a macroblock having a size of 8×8 pixels in the median level.

The lower level motion vector generation unit 140 generates a lower level motion vector 142 by determining a lower-level search reference point based on the middle level motion vector and performing a local-search process on a predetermined search range of the past lower level frame 118 based on the determined lower-level search reference point.

Figure 3:
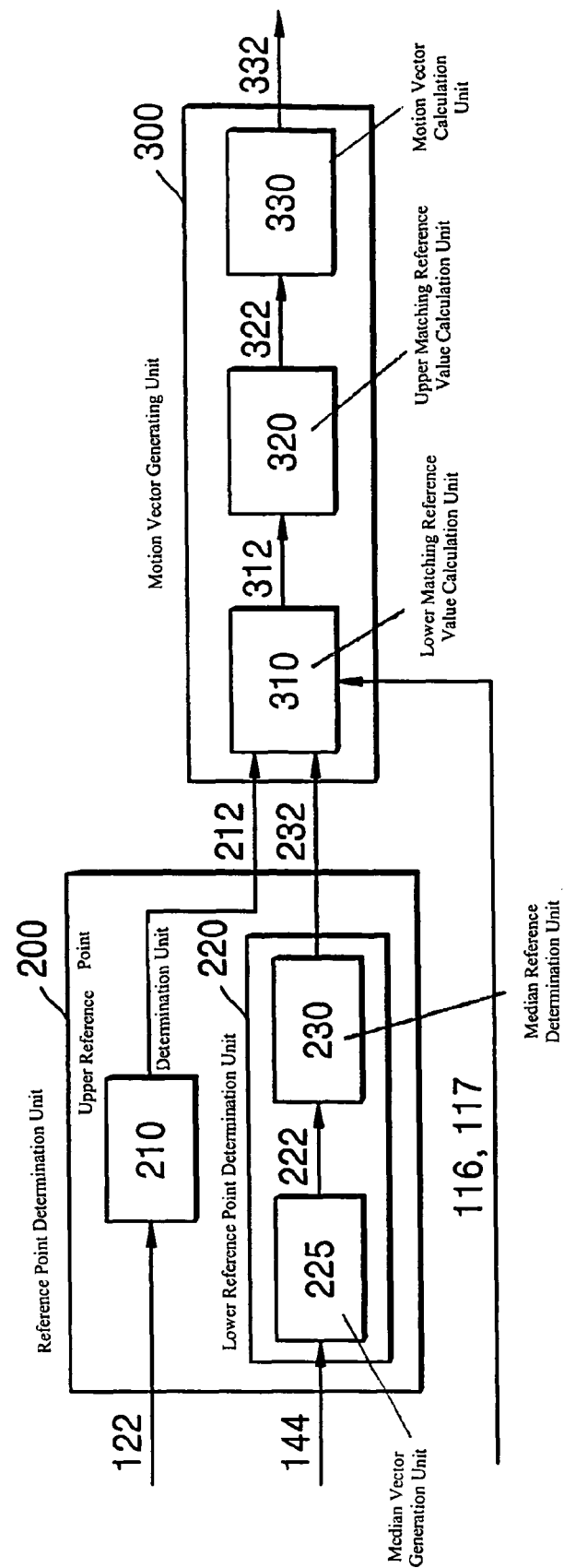
FIG. 3 is a diagram showing a middle level motion vector generation apparatus according to an exemplary embodiment of the present invention.

FIG. 3 is a diagram showing a middle level motion vector generation apparatus according to an exemplary embodiment of the present invention.

The middle level motion vector generation apparatus comprises a reference point determination unit 200 and a motion vector generation unit 300.

The reference point determination unit 200 comprises an upper reference point determination unit 210 for determining an upper reference point 212 from the upper level motion vector 122 and a lower reference point determination unit 220 for determining a lower reference point 232 from the lower level motion vector 144.

The upper reference point determination unit 210 performs a scaling process on the upper level motion vector 122 by the decimation ratios of the upper and lower levels and determines a block point in the middle level indicated by the scaled upper level motion vector 122 to be an upper reference point.

The upper level motion vector 122 means a motion vector indicating a block point having the lowest matching reference value in the upper level. In some cases, two or more upper level motion vectors 122 may be used. In this case, the upper reference point determination unit 210 determines two or more upper level reference points like a first upper reference point, a second upper reference point, and so on.

The lower reference point determination unit 220 determines another reference point for the local-search in the median level, that is, a lower reference point, by using the lower level motion vector 144 of predetermined neighboring estimation blocks.

The neighboring estimation block means a block neighboring the current estimation block in the lower level. In general, since the inter-coding is performed from the upper left block to the lower right block, the motion vectors of blocks at the left, upper, and upper right side of the current estimation block which is to be inter-coded are determined before the motion vector of the current estimation block is determined.

In addition, since the neighboring estimation blocks have a close spatial relation with the current estimation block, the neighboring estimation blocks can be used to generate a motion vector of the current estimation block. In one of the methods using the spatial relation, the local-search reference point for the current estimation block in the middle level is determined by using a lower level motion vector in the neighboring estimation block.

The lower reference point determination unit 220 comprises a median vector generation unit 225 for generating a median vector by calculating a median value of the lower level motion vector 144 and a median reference point determination unit 230 for performing a scaling process on the generated median vector by the decimation ratios of the median and lower levels and determining a block point in the middle level indicated by the scaled median vector 232 to be a lower reference point.

The motion vector generation unit 300 generates a middle level motion vector 332 by performing a local search process on the past and current middle level frames 116 and 117 based on the upper and lower reference points 212 and 232. The motion vector generation unit 300 comprises a lower matching reference value calculation unit 310, an upper matching reference value calculation unit 320, and a motion vector calculation unit 330.

The lower matching reference value calculation unit 310 generates a lower matching reference value 312 by calculating a matching reference value for a predetermined search range based on the upper and lower reference points 212 and 232.

The lower matching reference value calculation is performed in units of the lower estimation block. The lower estimation block is a block consisting of some of the pixels in an estimation block. Types of the lower estimation block and the steps of the lower matching reference value calculation will be described later with reference to FIGS. 4A and 4B.

The matching reference value is obtained by inputting pixel values of the current and past estimation blocks to a predetermined measurement function. As described above, the measurement function includes SAD, SATD, and SSD functions.

The upper matching reference value calculation unit 320 generates an upper matching reference value 322 by summing the lower matching reference values 312 generated by the lower matching reference value calculation unit 310 or performing the other operations in accordance with the requirements of MBAFF mode in the motion picture standards. The requirements of MBAFF mode in the motion picture standards are associated with a size of an estimation block in median level, types and numbers of motion vector to be generated in the middle level in a case where the hierarchical motion estimation is applied to the MBAFF mode.

The motion vector calculation unit 330 generates a middle level motion vector 322 by determining a block point of the past frame having a lowest upper matching reference value out of the upper matching reference values and calculating a motion vector between the determined block point of the past frame and a block point of the current frame. Here, the block point having the lowest upper matching reference value is determined for each of the middle level motion vectors.

Now, a process for calculating a lower matching reference value will be described with reference to FIGS. 4A and 4B.

Figure 4A:
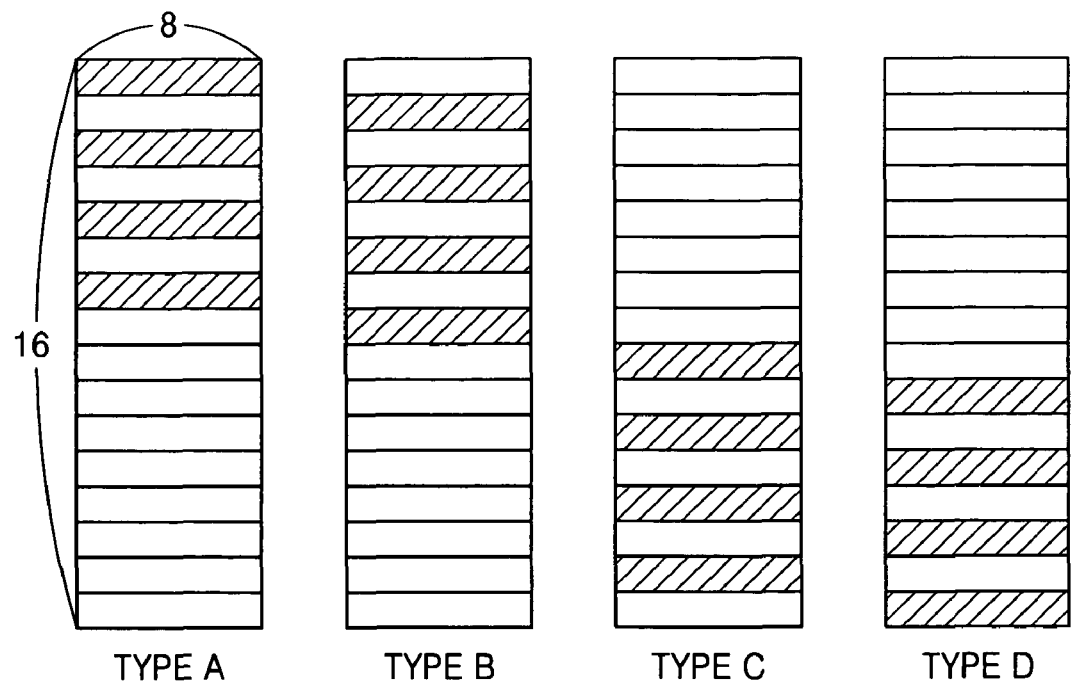
FIG. 4A is a view showing types of lower estimation blocks used as a unit of calculation of a lower matching reference value.

FIG. 4A is a view showing types of lower estimation blocks used as a unit of calculation of the lower matching reference value.

In an exemplary embodiment of the present invention, there are four types of lower estimation blocks as shown in FIG. 4A. The A-type lower estimation block is a block comprising pixel values of odd fields in an upper half of an estimation block in a median level. The B-type lower estimation block is a block comprising pixel values of even fields in the upper half of the estimation block in the median level. The C-type lower estimation block is a block comprising pixel values of odd fields in a lower half of the estimation block in the median level. The C-type lower estimation block is a block comprising pixel values of even fields in the lower half of the estimation block in the median level.

In the exemplary embodiment, the size of an estimation block of the middle level used to generate the lower estimation blocks is 8×16. Since the size of the estimation blocks of the middle level is 8×16, it is possible to easily apply the present invention to the H.264 and MPEG2 standards with a simple modification of algorithm.

Figure 4B:
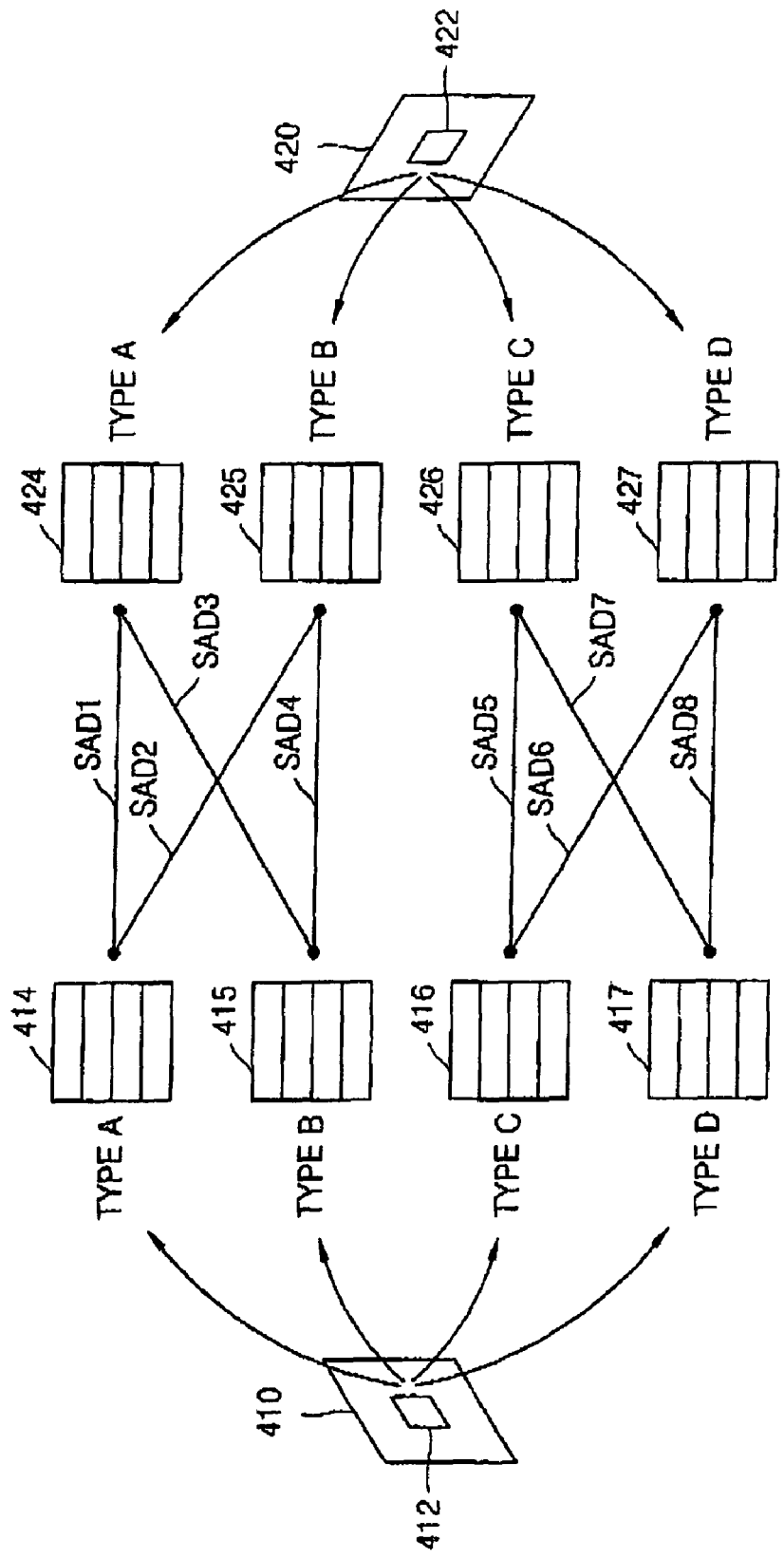
FIG. 4B is a view for explaining a principle of generating the lower matching reference value for the lower estimation blocks shown in FIG. 4A.

FIG. 4B is a view for explaining a principle of generating the lower matching reference value for the lower estimation blocks shown in FIG. 4A.

Frames 410 and 420 are past and current frames in the median level, respectively. Blocks 412 and 422 are past and current estimation blocks in the median level. In order to easily apply the present invention to the H.264 and the MPEG2, the size of an estimation block of the lower level is selected to be 16×32. As a result, the size of the estimation blocks 412 and 422 in the middle level become 8×16 as shown in FIG. 4A, and the size of the lower estimation blocks 414 to 417 and the lower estimation blocks 424 to 427 in the middle level become 8×4. The SAD value is used as a matching reference value, and the decimation ratio is 2:1.

Eight lower matching reference values for current and past estimation blocks are generated and defined as follows. Each of the lower matching reference values SAD1 to SAD8 is determined based on a combination of lower estimation blocks.

SAD1=an SAD value between an A-type lower estimation block of a past frame and an A-type lower estimation block of a current frame.

SAD2=an SAD value between an A-type lower estimation block of a past frame and a B-type lower estimation block of a current frame.

SAD3=an SAD value between a B-type lower estimation block of a past frame and an A-type lower estimation block of a current frame.

SAD4=an SAD value between a B-type lower estimation block of a past frame and a B-type lower estimation block of a current frame.

SAD5=an SAD value between a C-type lower estimation block of a past frame and a C-type lower estimation block of a current frame.

SAD6=an SAD value between a C-type lower estimation block of a past frame and a D-type lower estimation block of a current frame.

SAD7=an SAD value between a D-type lower estimation block of a past frame and a C-type lower estimation block of a current frame.

SAD8=an SAD value between a D-type lower estimation block of a past frame and a D-type lower estimation block of a current frame.

The number of the generated lower matching reference values SAD1 to SAD8 is determined based on the search range and the number of the search reference points.

For example, when the number of the past estimation blocks is $N_B$ and the number of the search reference points is $N_{ref}$, the number of the generated lower matching reference values 412 is:

$$N_{low} = N_B \times N_{ref} \times 8.$$

Now, a process for generating upper matching reference values from the lower matching reference values will be described with reference to FIGS. 5 to 7. In the figures, the symbol "−" denotes an SAD operation. The left side of the symbol "−" is a block of a past frame. The right side of the symbol "−" is a block of a current frame. The symbol "+" denotes a sum operation. In this process, the decimation ratio is assumed to be 2:1.

Figure 5:
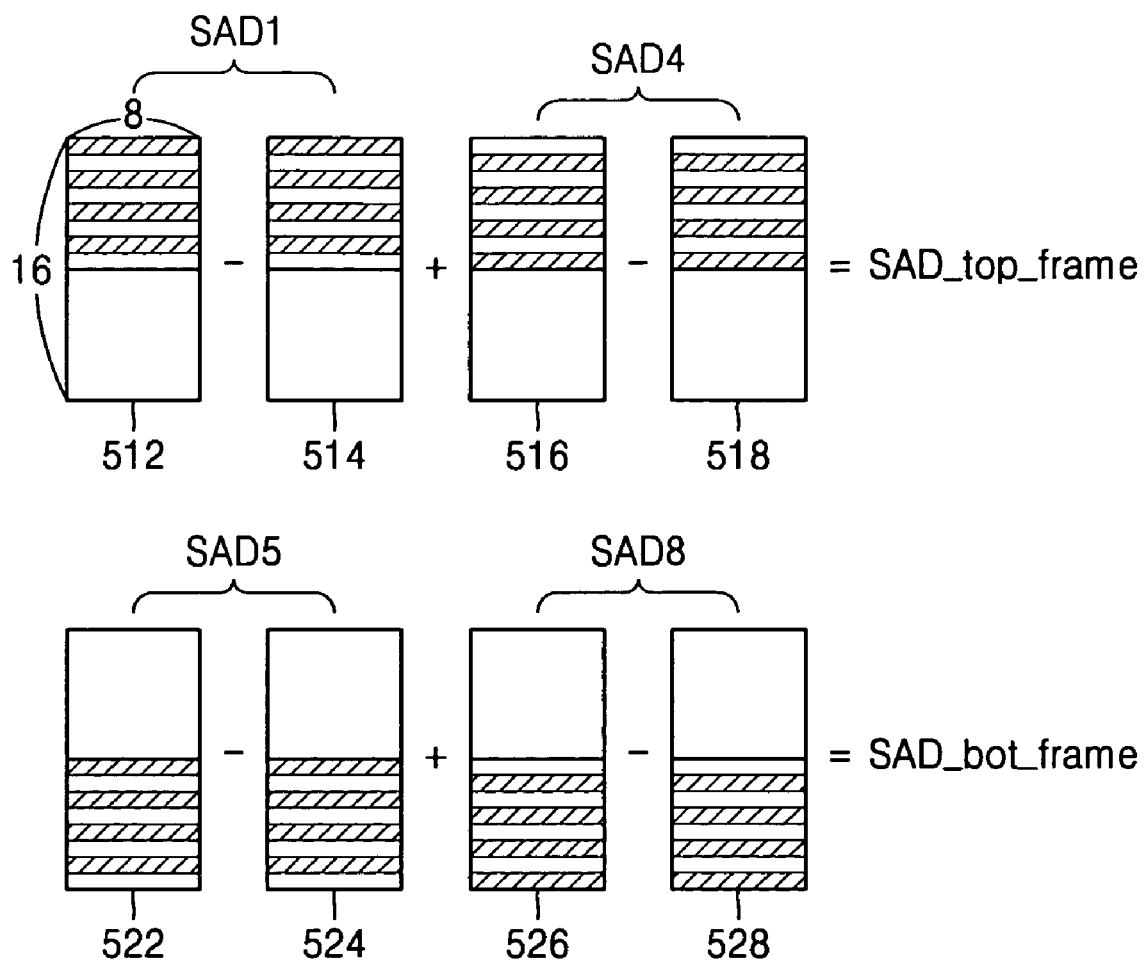
FIG. 5 is a view showing a process for generating upper matching reference values used for frame motion estimation in case of applying an exemplary embodiment of the present invention to the H.264 standard.
Figure 6:
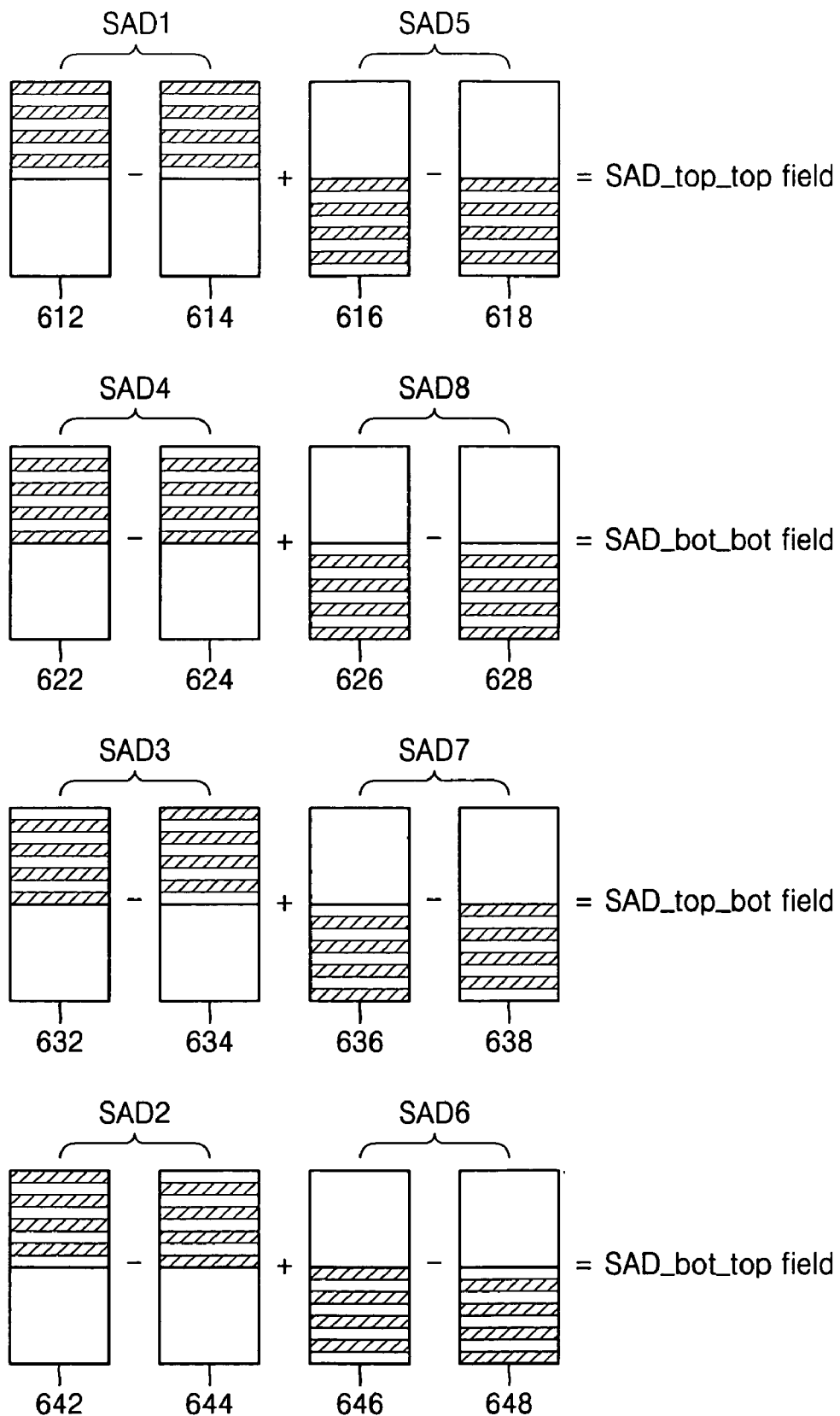
FIG. 6 is a view showing a process for generating upper matching reference values used for field motion estimation in case of applying an exemplary embodiment of the present invention to the H.264 standard.

FIGS. 5 and 6 are views showing a process for generating the upper matching reference values in case of applying the present invention to the H.264 standard.

In a case where hierarchical motion estimation is applied to the H.264 standard, the requirements of the MBAFF mode are as follows.

(Requirement 1)
The size of an estimation block in a middle level is 8×16.

(Requirement 2)
Six matching reference values to be generated in the middle level are: a top-top frame matching reference value SAD_top-top_frame used for an upper half of a current estimation block and an upper half of a corresponding past estimation block; a bottom-bottom frame matching reference value SAD_bot-bot_frame used for a lower half of a current estimation block and a lower half of a corresponding past estimation block; a top-top field matching reference value SAD_top-top_field used for an odd field of a current estimation block and an odd field of a corresponding past estimation block; a bottom-bottom field matching reference value SAD_bot_bot_field used for an even field of a current estimation block and an even field of a corresponding past estimation block; a top-bottom field matching reference value SAD_top-bot_field used for an odd field of a current estimation block and an even field of a corresponding past estimation block; and a bottom-top field matching reference value SAD_bot-top_field used for an even field of a current estimation block and an odd field of a corresponding past estimation block.

Requirement 1 is associated with characteristics of the H.264 standard that the size of a lower level estimation block is 16×32 and the decimation ratio is 2:1.

Requirement 2 is associated with characteristics of the H.264 standard that there are six motion estimation modes in the MBAFF mode of the H.264 standard: a top frame motion estimation mode; a bottom frame motion estimation mode; a top-top field motion estimation mode; a bottom-bottom field motion estimation mode; a top-bottom field motion estimation mode; and a bottom-top field motion estimation mode.

The upper matching reference values in the H.264 are generated by using Equation 1. Equation 1 is derived from characteristics of estimation modes of the H.264.

$$SAD\_top\_frame = SAD1 + SAD4$$

$$SAD\_bot\_frame = SAD5 + SAD8$$

$$SAD\_top\text{-}top\_field = SAD1 + SAD5$$

$$SAD\_bot\text{-}bot\_field = SAD4 + SAD8$$

$$SAD\_top\text{-}bot\_field = SAD3 + SAD7$$

$$SAD\_bot\text{-}top\_field = SAD2 + SAD6 \qquad \text{[Equation 1]}$$

Here, SAD_top_frame denotes an upper matching reference value used to generate a top frame motion vector. SAD_bot_frame denotes an upper matching reference value used to generate a bottom frame motion vector. SAD_top-top_field denotes an upper matching reference value used to generate a top-top field motion vector. SAD_bot-bot_field denotes an upper matching reference value used to generate a bottom-bottom field motion vector. SAD_top-bot_field denotes an upper matching reference value used to generate a top-bottom field motion vector. SAD_bot-top_field denotes an upper matching reference value used to generate a bottom-top field motion vector.

As shown in Equation 1, in the H.264 standard, the six upper matching reference values are generated to meet Requirements 1 and 2 of the H.264 by using the values SAD1 to SAD8 out of the SAD values in FIG. 4b.

FIG. 5 is a view showing a process for generating the upper matching reference values used for frame motion estimation in case of the H.264.

The upper matching reference values for H.264 frame motion estimation are calculated by using the characteristics of the frame motion estimation defined in the H.264 and the lower matching reference values in FIG. 4A.

Referring to FIG. 5, blocks 512, 514, . . . , 528 are the middle level estimation blocks in accordance with the H.264 standard. As shown in FIG. 4A, the lower estimation blocks in the middle level are blocks comprising obliquely lined regions of the middle level estimation blocks 512, 514, . . . , 528. Since each of the middle level estimation blocks has a size of 8×16 pixels, the lower estimation block in the middle level has a size of 8×4 pixels.

In FIG. 5, a block comprising obliquely lined regions of the estimation blocks 512 and 514 is an A-type lower estimation block; a block comprising obliquely lined regions of the estimation blocks 516 and 518 is a B-type lower estimation block; a block comprising obliquely lined regions of the estimation blocks 522 and 524 is a C-type lower estimation block; and a block comprising obliquely lined regions of the estimation blocks 526 and 528 is a D-type lower estimation block.

In the conventional method, a matching reference value used to generate a top frame motion vector is an SAD value for an upper half block (8×8) of the middle level estimation block (8×16), and a matching, reference value used to generate a bottom frame motion vector is an SAD value for a lower half block (8×8) of the middle level estimation block (8×16).

However, in the exemplary embodiment shown in FIG. 5, a matching reference value used to generate the top frame motion vector is a sum of a matching reference value for the A-type lower estimation block (8×4) and a matching reference value for the B-type lower estimation block (8×4). Similarly, a matching reference value used to generate the bottom frame motion vector is a sum of a matching reference value for the C-type lower estimation block (8×4) and a matching reference value for the D-type lower estimation block (8×4).

FIG. 6 is a view showing a process for generating upper matching reference values used for field motion estimation in case of the H.264.

Like FIG. 6, the upper matching reference values used for field motion estimation are calculated by using the characteristics of the field motion estimation and the lower matching reference values shown in FIG. 4A.

In other words, according to the exemplary embodiment shown in FIG. 6, the matching reference value used to generate a top-top field motion vector is a sum of a matching reference value SAD1 for an A-type lower estimation block (8×4) and a matching reference value SAD5 for a C-type lower estimation block (8×4). The matching reference value used to generate a bottom-bottom field motion vector is a sum of a matching reference value SAD4 for a B-type lower estimation block (8×4) and a matching reference value SAD8 for a D-type lower estimation block (8×4).

In addition, according to an exemplary embodiment of the present invention, the matching reference value used to generate a top-bottom field motion vector is a sum of a matching reference value SAD3 for a B-type lower estimation block (8×4) in a past frame and an A-type lower estimation block (8×4) in a current frame and a matching reference value SAD7 for a D-type lower estimation block (8×4) in a past frame and a C-type lower estimation block (8×4) in a current frame. Similarly, the matching reference value used to generate a bottom-top field motion vector is a sum of a matching reference value SAD2 for an A-type lower estimation block (8×4) in a past frame and a B-type lower estimation block (8×4) in a current frame and a matching reference value SAD6 for a C-type lower estimation block (8×4) in a past frame and a D-type lower estimation block (8×4) in a current frame.

In a conventional method, a matching reference value used to generate a top-top field motion vector is obtained by performing an SAD operation on a block (8×8) consisting of only odd fields of the estimation blocks (8×16)

However, in the exemplary embodiment shown in FIG. 6, the matching reference value used to generate a top-top field motion vector is a sum of a matching reference value SAD1 for an A-type lower estimation block (8×4) and a matching reference value SAD5 for a B-type lower estimation block (8×4). The other field motion vectors are also obtained by performing a similar process on the different types of the low estimation blocks.

Theoretically, since definitions of the matching reference values in FIGS. 5 and 6 are different from the conventional method, the block points having the lowest matching reference value determined by using the matching reference values of FIGS. 5 and 6 may also be different from the conventional method.

However, since the measurement function includes a subtraction operation on pixel values in estimation blocks and an absolute value operation on the subtraction result, a sum of lower matching reference values calculated from some portions of an estimation block are not substantially different from a matching reference value calculated from the entire estimation block.

In addition, the matching reference value is used for a comparison operation for determining a block point having the lowest matching reference value. Therefore, even though the lower matching reference value is defined like FIG. 5, the block point having the lowest matching reference value is not substantially different from the conventional one.

Now, the amount of SAD operation in an exemplary embodiment of the present invention will be described in comparison with the conventional method.

The total amount of the operation for generating the six motion vectors remarkably decreases in comparison with the conventional method. This is because the lower matching reference values SAD1 to SAD8 are commonly used for the frame and field estimation processes.

In the conventional method, the total amount of the operation for generating the six motion vectors is calculated as follows. In the calculation, one SAD operation on the 8×4 blocks is considered to be a unit operation.

(Total Amount of Operation in Conventional Method)

= (Amount of Six Operations *SADs* on 8 × 8 Blocks)

= (6 × 2 Unit Operations)

= (12 Unit Operations)

On the other hand, in the exemplary embodiment shown in FIGS. 5 and 6, the total amount of the operation for generating the six middle level motion vectors is calculated as follows.

(Total Amount of Operation in Embodiment in FIGS. 5 and 6)

= (Amount of Operation for Generating *SAD*1 to *SAD*8) +

(Amount of Sum Operation)

= (8 Unit Operations) + α

Here, α denotes an operation amount of the sum operation.

In general, since the amount of the sum operation, α, is much smaller than the amount of the SAD operation, the amount of the sum operation has a negligible effect on the total amount of operations. As a result, the amount of the operations in the method according to the exemplary embodiment shown in FIGS. 5 and 6 can be reduced by 8/12 (=66.6%) in comparison with the conventional method. In general, as the number of the local-search reference points increase and the range of the local search is widened, the amount of the operations further increases. Therefore, in this case, the method according to the exemplary embodiment of the present invention is greatly effective.

Figure 7:
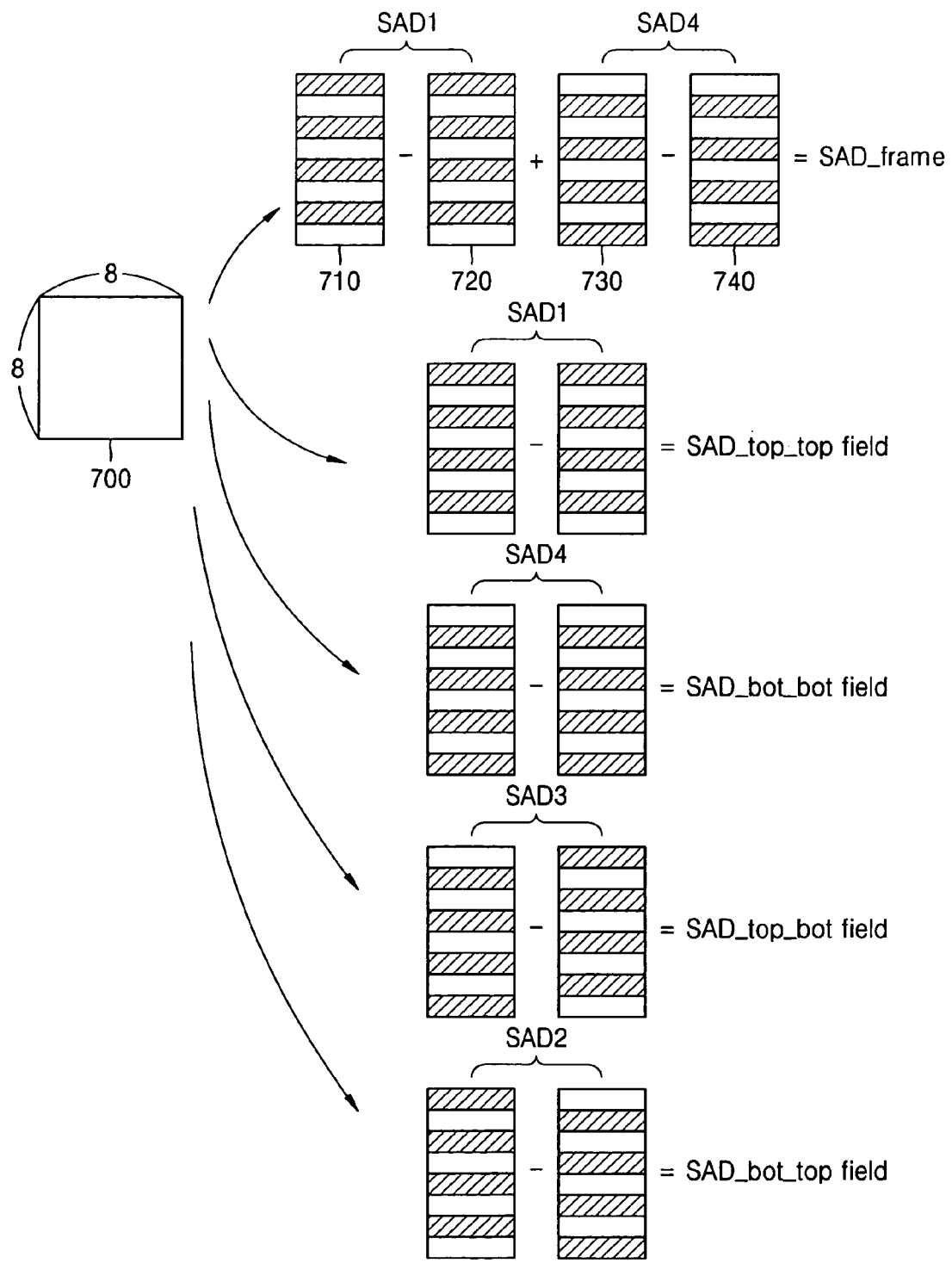
FIG. 7 is a view showing a process for generating upper matching reference values from lower matching reference values in case of applying an exemplary embodiment of the present invention to the MPEG2 standard.

FIG. 7 is a view showing a process for generating the upper matching reference values from the lower matching reference values in the case of applying the present invention to the MPEG2 standard.

In a case where hierarchical motion estimation is applied to the MPEG2 standard, the requirements of the MBAFF mode are as follows.

(Requirement 1)

The size of a middle level estimation block is 8×8.

(Requirement 2)

Five matching reference values to be calculated in the middle level are: a frame matching reference value SAD_frame used for a current estimation block and a corresponding past estimation block; a top-top field matching reference value SAD_top-top_field used for an odd field of a current estimation block and an odd field of a corresponding past estimation block; a bottom-bottom field matching reference value SAD_bot_bot_field used for an even field of a current estimation block and an even field of a corresponding past estimation block; a top-bottom field matching reference value SAD_top-bot_field used for an odd field of a current estimation block and an even field of a corresponding past estimation block; and a bottom-top field matching reference value SAD_bot-top_field used for an even field of a current estimation block and an odd field of a corresponding past estimation block.

Requirement 1 is associated with characteristics of the MPEG2 standard that the size of a lower level estimation block is 16×16 and the decimation ratio is 2:1. Requirement 2 is associated with characteristics of the MPEG2 standard that there are five motion estimation modes in the MBAFF mode of the MPEG2 standard: a frame motion estimation mode; a top-top field motion estimation mode; a bottom-bottom field motion estimation mode; a top-bottom field motion estimation mode; and a bottom-top field motion estimation mode.

Referring to FIG. 7, the block 700 is an estimation block in the middle level in accordance with the MPEG2 standard. In the MPEG2 standard, the upper matching reference value satisfying Requirements 1 and 2 of the MPEG2 standard can be generated by using only the matching reference values SAD1 to SAD4 out of the matching reference values shown in FIG. 4B.

The upper matching reference values in the MPEG2 are generated by using Equation 2.

$$SAD\_frame = SAD1 + SAD4$$

$$SAD\_top\text{-}top\_field = SAD1$$

$$SAD\_bot\text{-}bot\_field = SAD4$$

$$SAD\_top\text{-}bot\_field = SAD3$$

$$SAD\_bot\text{-}top\_field = SAD2 \quad \text{[Equation 2]}$$

Here, SAD_frame denotes an upper matching reference value used to generate a frame motion vector. SAD_top_field denotes an upper matching reference value used to generate a top-top field motion vector. SAD_bot-bot_field denotes an upper matching reference value used to generate a bottom-bottom field motion vector. SAD_top-bot_field denotes an upper matching reference value used to generate a top-bottom field motion vector. SAD_bot-top_field denotes an upper matching reference value used to generate a bottom-top field motion vector.

Referring to Equation 2, the definition of the matching reference values used for frame motion estimation in the middle level according to an exemplary embodiment of the present invention is different from the definition of the matching reference values used for the conventional frame motion estimation. In the conventional frame motion estimation, each of the matching reference values calculated for the current and past estimation block 700 in the middle level is used as a matching reference value for frame motion estimation. However, in the present invention, a sum of the matching reference value calculated for the A-type block of the past and current frame and the matching reference value calculated for the B-type block of the past and current frame is used as a matching reference value for frame motion estimation.

As shown in FIGS. 5 to 7, in the two cases of applying an exemplary embodiment of the present invention to the H.264 and MPEG2 standards, the process for generating the lower matching reference values SAD1 to SAD is the same, except that the processes for generating the upper matching reference values are different from each other. Therefore, it is possible to easily apply the present invention to the H.264 and MPEG2 standards with a simple modification of algorithm from Equation 1 to Equation 2.

Figure 8:
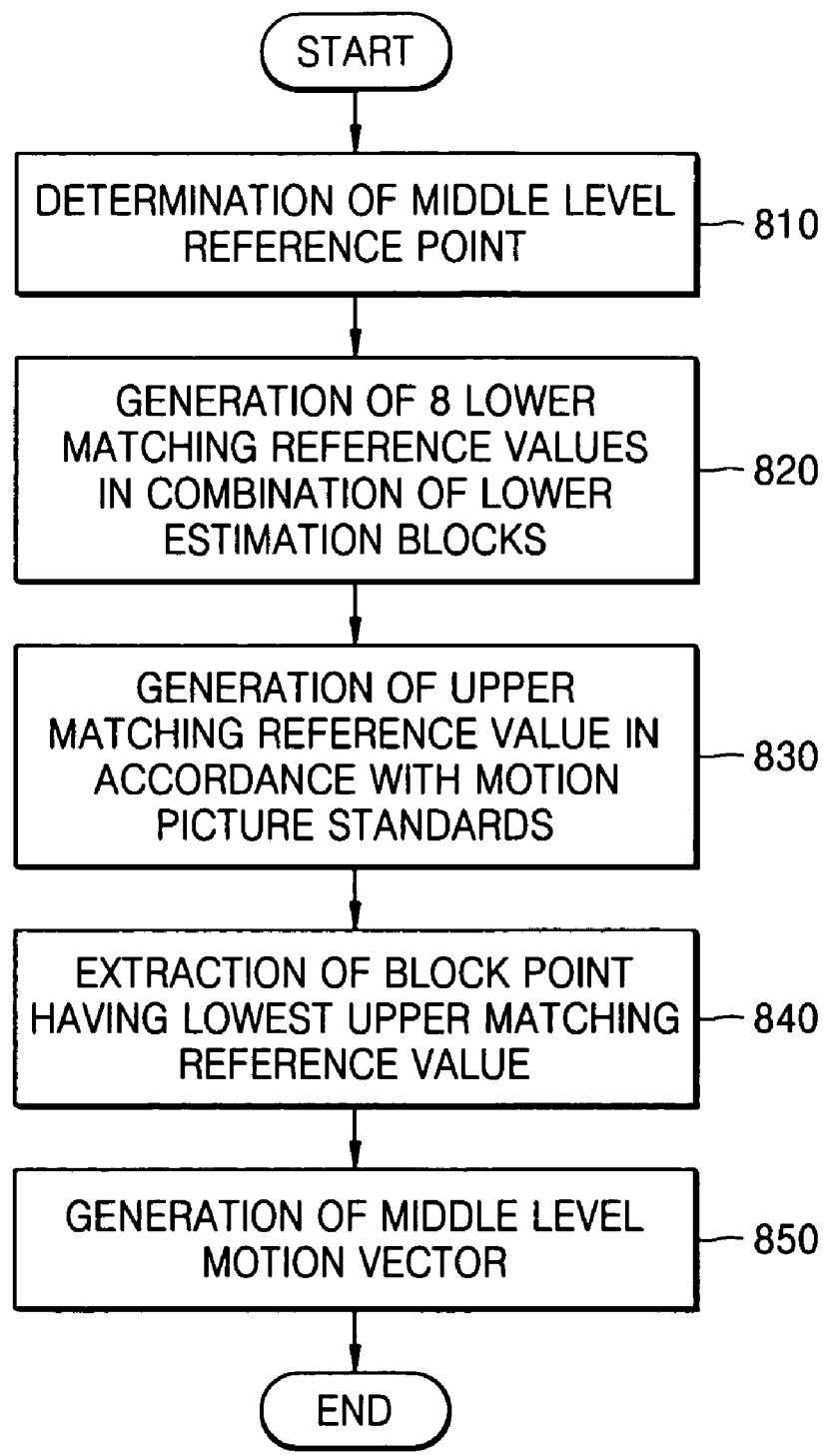
FIG. 8 is a flowchart of a method of generating a middle level motion vector according to an exemplary embodiment of the present invention.

FIG. 8 is a flowchart of a method of generating a middle level motion vector according to an exemplary embodiment of the present invention.

In operation 810, a reference point determination unit generates a reference point used for a local search process in a median level. The reference point may be generated from an upper level motion vector of a current estimation block or a lower level motion vector of a neighboring estimation block.

In a case where the reference point is generated from the upper level motion vector, the upper level motion vector is scaled with a decimation ratio, and the reference point is generated by using a block point indicated by the scaled upper level motion vector. On the other hand, in a case where the reference point is generated from the lower level motion vector, a median vector of the lower level motion vector of the neighboring estimation block is scaled, and the reference point is generated by using a block point indicated by the scaled median vector. Two or more reference points may be used.

In operation 820, a lower matching reference value is generated. The lower matching reference value is a matching reference value for the lower estimation block of the past and current frames. The lower estimation block is shown in FIG. 4, and the lower matching reference value is one of the matching reference values SAD1 to SAD8 for two lower estimation blocks selected from four types of the lower estimation blocks in accordance with a given rule. Each of the lower matching reference values is calculated over a predetermined search range based on a predetermined reference point.

In operation 830, upper matching reference values are calculated in each of the motion picture standards. The number of the generated upper matching reference values is the same as the number of the middle level motion vectors defined in accordance with each of the motion picture standards. In the H.264 standard, the size of the middle level motion vector is 8×16, the number of the frame motion vectors is 2, and the number of the field motion vectors is 4. The upper matching reference values corresponding to these motion vectors are generated by using Equation 1. On the other hand, in the MPEG2 standard, the size of the middle level motion vector is 8×8, the number of the frame motion vectors is 1, and the number of the field motion vectors is 4. The upper matching reference values corresponding to these motion vectors are generated by using Equation 2.

In operation 840, a block point in a past frame having the lowest upper matching reference value among all types of the upper matching reference values is determined. Six and five block points are determined in case of the H.264 and MPEG2 standards, respectively.

In operation 850, a middle level motion vector is generated by using the block points determined in Step 840.

According to an exemplary embodiment of the present invention, since matching reference values used to generate a middle level motion vector are hierarchically calculated, the amount of operations needed for the calculation of the matching reference values can be reduced.

In addition, an exemplary embodiment of the present invention can be commonly applied to the H.264 and MPEG2 standards with a simple modification of algorithm for generating an upper matching reference value.

A method of generating a motion vector according to an exemplary embodiment of the present invention can be embodied with a computer program. Functional programs, codes, and code segments for accomplishing the computer program can be easily construed by programmers skilled in the art to which the present invention pertains. In addition, the computer program can be stored on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A motion vector generation method for generating a second-resolution-frame motion vector in a second resolution frame having a second resolution from a first-resolution-frame motion vector in a first resolution frame having a first resolution, the second resolution being higher than the first resolution, the method comprising:
    (a) determining a local-search reference point in the second resolution frame based on the first-resolution-frame motion vector; and
    (b) generating the second-resolution-frame motion vector by performing a local-search process on the second resolution frame based on the local-search reference point,
    wherein generating the second-resolution-frame motion vector comprises;
    calculating lower matching reference values based on differences between lower estimation blocks of a past frame having the second resolution and lower estimation blocks of a current frame having the second resolution;
    calculating upper matching reference values by selectively summing the lower matching reference values; and
    determining the second-resolution-frame motion vector based the upper matching reference values,
    wherein the lower estimation blocks of the current frame comprise pixel values of some portions of a current estimation block and the lower estimation blocks of the past frame comprises pixel values of some portions of a past estimation block, the current estimation block comprises an estimation block of the current frame, and the past estimation block comprises an estimation block of the past frame.

2. The motion vector generation method according to claim 1,
    wherein calculating upper matching reference values comprises
        calculating upper matching reference values corresponding to motion vectors defined in a macroblock adaptive frame-field (MBAFF) mode based on the lower matching reference values; and
    wherein determining the second-resolution-frame motion vector comprises
        determining a past-frame block point representing a position of a past frame having a minimum value out of the upper matching reference values, and calculating the second-resolution-frame motion vector based on the past-frame block point.

3. The motion vector generation method according to claim 1, wherein each of the estimation block of the current frame and the estimation blocks of the past frame is a macroblock.

4. The motion vector generation method according to claim 3, wherein the lower estimation block comprises a first lower estimation block having odd fields of the macroblock and a second lower estimation block having even fields of the macroblock.

5. The motion vector generation method according to claim 4, wherein calculating lower matching reference values comprises:
    calculating a first lower matching reference value which is a reference value between a first lower estimation block of the past frame and a first lower estimation block of the current frame;
    calculating a second lower matching reference value which is a reference value between the first lower estimation block of the past frame and a second lower estimation block of the current frame;
    calculating a third lower matching reference value which is a reference value between a second lower estimation block of the past frame and the first lower estimation block of the current frame; and
    calculating a fourth lower matching reference value which is a reference value between the second lower estimation block of the past frame and the second lower estimation block of the current frame.

6. The motion vector generation method according to claim 1, wherein (a) comprises:
    (a1) determining a local-search upper reference point by scaling the first-resolution-frame motion vector.

7. The motion vector generation method according to claim 1, wherein (a) comprises:

(a2) determining a local-search lower reference point based on neighboring estimation blocks near the current estimation block of the block to be encoded in an original resolution.

8. The motion vector generation method according to claim 7, wherein (a2) comprises:
   (a21) generating a median vector of the motion vectors in the original frame of the neighboring estimation blocks; and
   (a22) determining the local-search reference point by scaling the median vector.

9. The motion vector generation method according to claim 8, wherein the neighboring estimation blocks include estimation blocks at the left, the right, and the upper right sides of the current estimation block.

10. The motion vector generation method according to claim 1, wherein the matching reference values are generated by using one of sum of absolute difference (SAD), sum of absolute transformed difference (SATD), and sum of squared difference (SSD) functions.

11. A motion vector generation method comprising:
   converting an original-resolution frame into hierarchical-resolution frames in a current estimation block to be currently encoded; and
   generating motion vectors of the hierarchical-resolution frames,
   wherein generating motion vectors of the hierarchical-resolution frames comprises;
   determining a local-search reference point in second resolution frame based on first-resolution-frame motion vector; and
   calculating lower matching reference values based on differences between lower estimation blocks of a past frame having the second resolution and lower estimation blocks of a current frame having the second resolution;
   calculating upper matching reference values by selectively summing the lower matching reference values; and
   determining the second-resolution-frame motion vector based the upper matching reference values,
   wherein the lower estimation blocks of the current frame comprise pixel values of some portions of a current estimation block and the lower estimation blocks of the past frame comprises pixel values of some portions of a past estimation block, the current estimation block comprises an estimation block of the current frame, and the past estimation block comprises an estimation block of the past frame.

12. The motion vector generation method according to claim 11, further comprising:
   generating a lower level motion vector in the original resolution frame by performing a local-search process using the second-resolution motion vector as a reference point based on the lower matching reference values.

13. A motion vector generation apparatus for generating a second-resolution-frame motion vector in a second resolution frame having a second resolution from a first-resolution-frame motion vector in a first resolution frame having a first resolution, the second resolution being higher than the first resolution, the apparatus comprising:
   a reference point determination unit which determines a local-search reference point in the second resolution frame based on the first-resolution-frame motion vector; and
   a motion vector generation unit which generates the second-resolution-frame motion vector by performing a local search process on the second resolution frame based on the local-search reference point,
   wherein the motion vector generation unit comprises
   a lower matching reference value calculation unit which calculates lower matching reference values based on differences between lower estimation blocks of a past frame having the second resolution and lower estimation blocks of a current frame having the second resolution;
   an upper matching reference value calculation unit which calculates upper matching reference values by selectively summing the lower matching reference values; and
   a motion vector calculation unit which determines the second-resolution-frame motion vector based the upper matching reference values,
   wherein the lower estimation blocks of the current frame comprise pixel values of some portions of a current estimation block and the lower estimation blocks of the past frame comprises pixel values of some portions of a past estimation block, the current estimation block comprises an estimation block of the current frame, and the past estimation block comprises an estimation block of the past frame.

14. The motion vector generation apparatus according to claim 13, wherein the an upper matching reference value calculation unit
   calculates upper matching reference values corresponding to motion vectors defined in a macroblock adaptive frame-field (MBAFF) mode based on the lower matching reference values; and
   the motion vector calculation unit determines a past-frame block point representing a position of a past frame having a minimum value out of the upper matching reference values, and calculates the second-resolution-frame motion vector based on the determined past-frame block point.

15. The motion vector generation apparatus according to claim 14, wherein each of the estimation block of the current frame and the estimation block of the past frame is a macroblock.

16. The motion vector generation method according to claim 1, wherein the second resolution frame is decimated from original image frames at a decimation ratio of 2:1.

17. The motion vector generation method according to claim 1, wherein the first resolution frame is decimated from original image frames at a decimation ratio of 4:1.

* * * * *